March 15, 1932.  G. WALTHER ET AL  1,849,650
INTERCHANGEABLE WHEEL MOUNTING
Filed Sept. 6, 1930
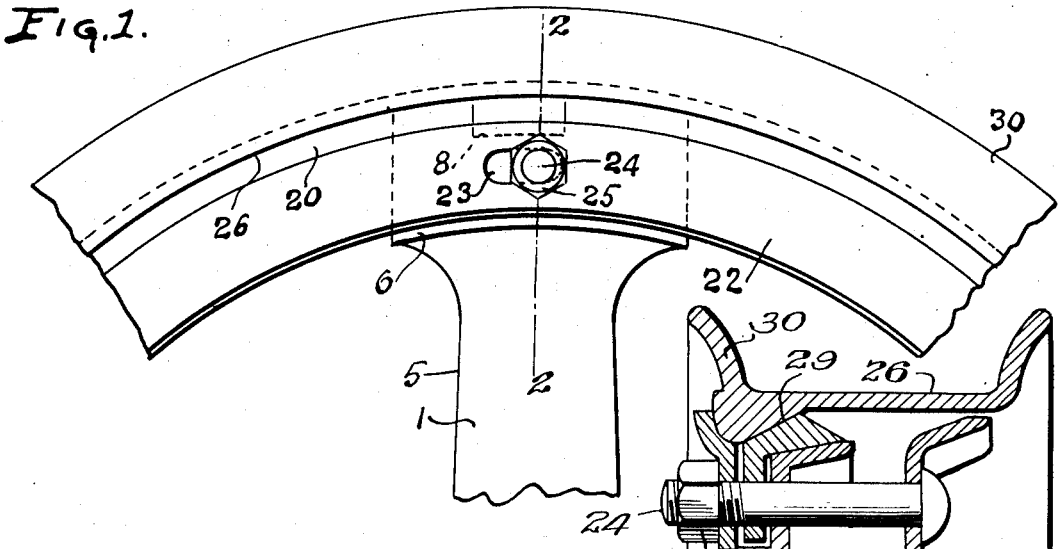
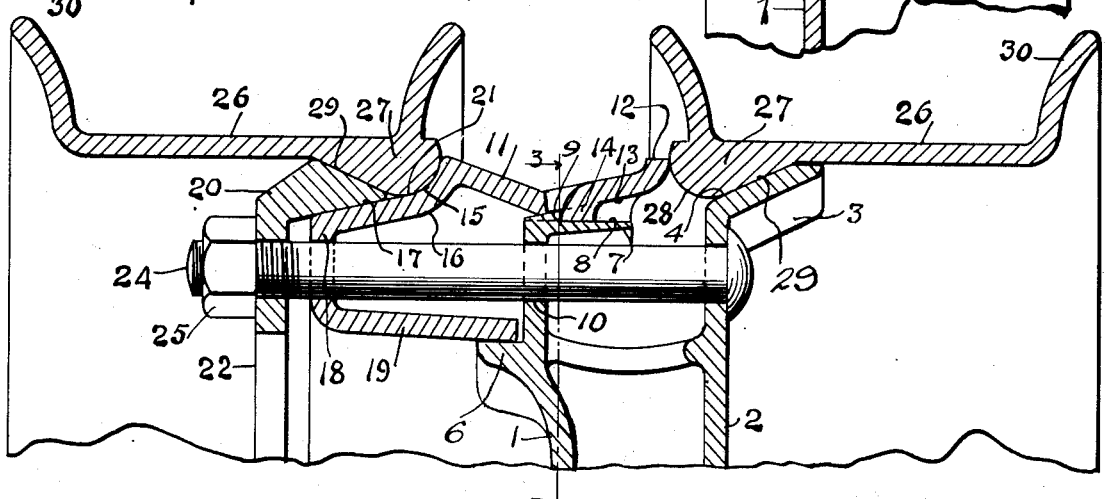
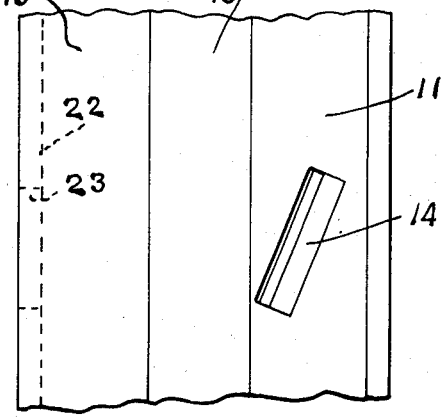
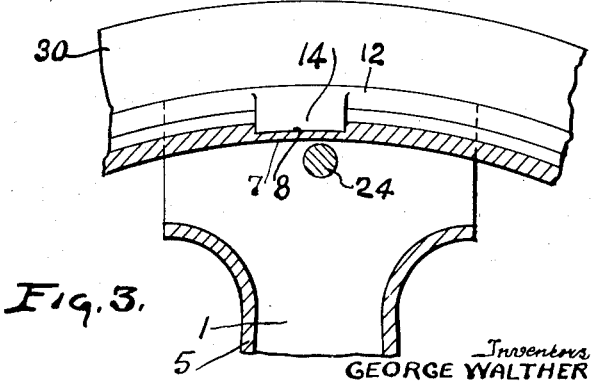
Inventors
GEORGE WALTHER
GUY A. BAKER,
HARRY BAKER,
BY Toulmin & Toulmin
Attorneys Patented Mar. 15, 1932

1,849,650

UNITED STATES PATENT OFFICE

GEORGE WALTHER, GUY A. BAKER, AND HARRY BAKER, OF DAYTON, OHIO, ASSIGNORS TO THE DAYTON STEEL FOUNDRY COMPANY, OF DAYTON, OHIO, A CORPORATION OF OHIO

INTERCHANGEABLE WHEEL MOUNTING

Application filed September 6, 1930. Serial No. 480,134.

This invention relates to improvements in wheels, and has for its object the provision of a wheel the outer periphery of which, together with the outer ends of the spokes, are so formed that they can accommodate either a single rim or a double rim.

It is the object of this invention to provide a wheel having a periphery adapted to seat either one of two rims.

It is particularly the object of this invention to provide, in connection with a wheel formed to accommodate two rims, means for supporting one rim adjacent one edge of the wheel and aiding the wheel in supporting and holding in position another rim.

It is also an object of this invention to provide for this purpose a combination felly and spacer ring so positioned with relation to the periphery of the wheel that it can support in conjunction with the wheel two rims.

It is also an object of this invention to provide means whereby the combination spacer and felly may so interlock with the wheel that the parts will be firmly held in place.

These and other advantages will appear from the description taken in connection with the drawings.

Referring to the drawings:

Figure 1 is a fragmentary view of a wheel showing a part of one spoke and the adjacent wheel rim parts.

Figure 2 is a section on the line 2—2 of Figure 1.

Figure 3 is a section on the line 3—3 of Figure 2.

Figure 4 is a view of a part of the combination felly and spacer, showing an interlocking lug.

Figure 5 is a fragmentary view of the wheel showing the present invention applied to a wheel for supporting a single rim.

This application is a continuation in part of my application Serial No. 333,780 filed January 21, 1929.

In Figure 1 there is shown a section of a wheel formed according to the present invention. In this wheel the spoke is indicated by the numeral 1 and is hollow, having an axially inner rim wall 2 with the inclined surface 3 on the extreme outer periphery of the axially inner edge or side of the wheel. The radially outer surface of this in-turned part is indicated by the numeral 4 and provides a seat for a certain part of one of the rims supported on the periphery of the wheel.

The axially outside wall of the spoke is indicated by the numeral 5. Upon this wall 5 is a ledge 6 adapted to support one part of the combination felly and spacer ring. The radially outer end of the wall of the spoke is bent axially inward on a plane parallel to the inclined surface 4 of the part 3 of the wheel, and is indicated by the numeral 7. In this last named in-turned part is a diagonal slot 8, the lower part of which is in a vertical plane parallel to the axis of the wheel, as shown in Figure 1. This slot is for receiving a diagonally disposed lug on the combination felly and spacer ring.

The radially outer surface of the part 7 has an inclined face 9 which engages a correspondingly inclined surface on the spacer ring and felly. The radially outer end of the spoke has bolt holes 10, as shown in Figure 2. The spacer ring and felly is indicated as a whole by the numeral 11. As shown in Figure 2, the righthand edge 12 of this spacer ring and felly is up-turned to engage a tire rim. Adjacent the part 12 there is an inclined surface 13, which corresponds with and fits against the inclined ends 7 on the axially outer walls of the spokes. Near the up-turned part 12 there is a lug 14. This lug is formed by slitting the adjacent parts of the spacer ring and felly and pressing down the slitted part so that it forms a lug to fit into the diagonal slot 8.

As the parts are placed in position, that is the spacer ring and felly are placed on the ends of the spokes, the lugs engage the slots and as the spacer ring and felly is pushed toward the wheel and given a turn, the lugs slide within the slots until the spacer ring and felly is properly seated, after which the parts are fastened together by means of bolts passing through holes. Adjacent the axially outer edge of the spacer ring and felly and somewhat remote from the said edge is an arcuate seat 15 adapted to receive and seat a certain part of another rim. The radially outer edge of the spacer ring and felly is bent radially inward from the parts just described. This radially inwardly turned part is indicated by the numeral 16, and has a bearing surface 17 thereon to receive and seat a wedging ring.

Extending from this last described part is a radially extending part 18, and extending axially inwardly toward the wheel is an annular part 19 which rests upon the ledge 6. When the end of the spoke and the spacer ring and felly are in the position shown in Figure 2 a rim may be supported on the inboard or righthand side of the wheel, as shown in this figure. In this case the rim is supported on the supporting shoulder 3 and the up-turned part of the spacer ring and felly. Another rim is supported on the outboard or lefthand side of the wheel, a certain part of the rim fitting in the arcuate seat 15 and held thereto by means of a wedging ring. This wedging ring is indicated by the numeral 20 and has an inclined surface 21 which coacts with the arcuate seat 15 for engaging the outboard rim for holding it in place.

Extending radially inwardly from the wedge part of the wedge ring is a flange 22 which has a hole 23 therein, in line with the holes in the end of the spoke. Extending through these holes is a bolt 24, which has on the end thereof a nut 25. By means of the nut and bolt the wedging ring may be wedged between the spacer ring and felly and the adjacent rim. By means of the bolt and nut the spacer ring and felly is jammed against the wheel so that the annular part 19 rests upon the ledge 6 and the up-turned part 12 is forced against the inboard rim so that both the inboard and the outboard rims are held together and firmly and securely bound to the periphery of the wheel and ends of the spokes.

Each rim is indicated by the numeral 26, and has a shoulder 27 that cooperates with the parts of the wheel just described, in holding the rim in place on the wheel. Each shoulder has an arcuate face 28 which fits between the up-turned part 12 of the spacer ring and felly and the periphery of the inclined surface 3 of the wheel. In the other case this arcuate face fits in the arcuate seat 15. Each rim and shoulder has also a face 29, which in one instance cooperates with the inclined surface 4, and in another case with the inclined surface 21 to hold the rims in their respective places, as shown in Figure 2. The radially outwardly turned margins of the rims are indicated by the numeral 30. The lugs and diagonal slots are placed over the spokes but are found with only alternate spokes, it not being necessary that these slots and lugs be used in connection with each spoke.

It is obvious from the foregoing description that whenever the parts are positioned as shown in Figure 1 a rotation of the wheel in one direction would tend to more firmly seat the rims to the wheel, due to the particular relation between the spacer ring and felly and the cooperating parts of the periphery of the wheel.

We desire to comprehend within our invention such modifications as may be clearly embraced within our claims and the scope of our invention.

Having thus fully described our invention, what we claim is new and desire to secure by Letters Patent is:

1. A vehicle wheel construction adapted for supporting a single or a plurality of tire carrying rims in assembled relation thereto comprising in combination, a wheel body, inclined inboard and outboard supporting surfaces on said wheel body facing axially outwardly, an inboard tire carrying rim mounted on and supported by said inboard surface, a supporting and spacing ring mounted on and supported by said outboard surface, and engaging said inboard rim, means formed on said ring for supporting an outboard tire carrying rim an outboard tire carrying rim mounted on said means and means for securing said rims and ring in assembled relation to the wheel body, said outboard seat being adapted to support a single tire carrying rim in central relation to the wheel body.

2. A vehicle wheel construction comprising a wheel body for supporting a single tire carrying rim substantially centrally of the wheel body or a pair of tire covering rims one on each side of the center of the wheel body, said wheel body having inclined inboard and outboard surfaces facing axially outboardly a spacer ring to be used when carrying a pair of tire-carrying rims, having an inclined rim supporting surface of the same diameter as said outboard surface, said spacer ring having a portion adapted to abut an inboard tire rim and another portion mounted upon the outboard supporting surface of the wheel body, and a wedging means having an inclined surface adapted to be mounted either on the inclined rim supporting surface of the spacer ring when a pair of rims are used or the outboard inclined surface of the wheel body when a single rim is used.

3. A vehicle wheel construction comprising a wheel body adapted to support a single tire-carrying rim substantially centrally of the wheel body or a pair of tire carrying rims one on each side of the center of the wheel body, said wheel body having inclined inboard and outboard surfaces facing axially outwardly a spacer ring to be used when mounting a pair of tire-carrying rims on said wheel body, said spacing ring having a portion for spacing two rims and another portion for seating the outboard tire rim and means for holding said last named rim in position on said spacer ring and to the wheel body.

4. A vehicle wheel construction comprising a wheel body adapted to support a single tire carrying rim substantially centrally of the wheel body or a pair of tire carrying rims one on each side of the center of the wheel body, said wheel body having inclined inboard and outboard surfaces facing axially outwardly, a spacer ring to be used when mounting a pair of tire carrying rims on said wheel body, said spacer ring having an inclined rim supporting surface of the same diameter as said outboard surface of the wheel body, and rim securing means for securing an outboard rim on the spacer ring or the wheel body.

5. A vehicle wheel construction comprising a wheel body adapted to support a single tire-carrying rim substantially centrally of the wheel body or a pair of tire-carrying rims one on each side of the center of the wheel body, said wheel body having inboard and outboard supporting surfaces; a spacing means to be used when carrying a pair of tire-carrying rims, having a rim supporting surface of the same diameter as the said outboard supporting surface, said spacing means having a portion adapted to contact with an inboard tire rim to secure the same to the said inboard supporting surface and another portion mounted upon the outboard supporting surface; and a rim securing means having a surface adapted to be mounted either on the rim supporting surface of the spacing means when a pair of rims are used, or on the outboard supporting surface of the wheel body when a single rim is used.

In testimony whereof, we affix our signatures.

GEORGE WALTHER.
GUY A. BAKER.
HARRY BAKER.